US012637604B2

(12) United States Patent
Knör

(10) Patent No.: US 12,637,604 B2
(45) Date of Patent: May 26, 2026

(54) SILICON-CONTAINING THERMALLY CONDUCTIVE PASTES

(71) Applicant: WACKER CHEMIE AG, Munich (DE)

(72) Inventor: Sebastian Knör, Emmerting (DE)

(73) Assignee: Wacker Chemie AG, Munich (DE)

( * ) Notice: Subject to any disclaimer, the term of this patent is extended or adjusted under 35 U.S.C. 154(b) by 510 days.

(21) Appl. No.: 18/274,737

(22) PCT Filed: Jan. 13, 2022

(86) PCT No.: PCT/EP2022/050695
§ 371 (c)(1),
(2) Date: Jul. 28, 2023

(87) PCT Pub. No.: WO2022/161787
PCT Pub. Date: Aug. 4, 2022

(65) Prior Publication Data
US 2024/0309258 A1 Sep. 19, 2024

Related U.S. Application Data

(63) Continuation of application No. PCT/EP2021/052213, filed on Jan. 29, 2021.

(51) Int. Cl.
*C09K 5/14* (2006.01)
*C08G 77/12* (2006.01)
(Continued)

(52) U.S. Cl.
CPC ................ *C09K 5/14* (2013.01); *C08G 77/12* (2013.01); *C08G 77/20* (2013.01); *C08K 3/02* (2013.01);
(Continued)

(58) Field of Classification Search
CPC .......... C09K 5/14; C08G 77/12; C08G 77/20; C08K 3/02; C08K 2003/023; C08K 2201/001
See application file for complete search history.

(56) References Cited

U.S. PATENT DOCUMENTS 4,292,223 A 9/1981 Theodore et al.
2001/0051673 A1 12/2001 Suzuki et al.
(Continued)

FOREIGN PATENT DOCUMENTS

| CN | 101104738 A | 1/2008 |
| EP | 1788031 B1 | 1/2012 |
| JP | 2019131669 A | 8/2019 |

OTHER PUBLICATIONS

Pulvermetallurgie: Technologien und Werkstoffe, Schatt, Werner, Wieters, Klaus-Peter, Kieback, Bernd, Chapter 2.

*Primary Examiner* — Bijan Ahvazi

(57) ABSTRACT

Crosslinkable heat-conducting silicone compositions (Y), methods for manufacturing and using the same. Where the compositions (Y) include 5-50% by volume of a crosslinkable silicone composition (S) and 50-95% by volume of at least one thermally conductive filler (Z) having a thermal conductivity of at least 5 W/mK. The compositions (Y) have a thermal conductivity of at least 0.6 W/mK and at least 20% by volume of metallic silicon particles present as thermally conductive fillers (Z) fulfil the following features: (a) the fillers (Z) have a median diameter x50 in the range of 30-150 µm, (b) the fillers (Z) are predominately rounded, and have a width/length ratio (aspect ratio w/l) that is at least 0.76, (c) the fillers (Z) have a distribution range SPAN ((x90−x10)/ x50) that is at least 0.40, and (d) the fillers (Z) contain at most 1.5% by weight of silicon particles that are smaller than 2 µm.

14 Claims, 4 Drawing Sheets

(51) Int. Cl.
  *C08G 77/20*          (2006.01)
  *C08K 3/02*           (2006.01)
(52) U.S. Cl.
  CPC ................. *C08K 2003/023* (2013.01); *C08K*
                                    *2201/001* (2013.01)

(56)                    References Cited

U.S. PATENT DOCUMENTS

| | | | |
|---|---|---|---|
| 2006/0228542 A1 | 10/2006 | Czubarow | |
| 2007/0117920 A1* | 5/2007 | Hirabayashi | ............ C08L 83/04 |
| | | | 524/588 |
| 2007/0135555 A1 | 6/2007 | Hirabayashi et al. | |
| 2016/0122611 A1 | 5/2016 | Yoshida et al. | |

* cited by examiner

SILICON-CONTAINING THERMALLY CONDUCTIVE PASTES

CROSS-REFERENCE TO RELATED APPLICATIONS

This application is a U.S. National Phase application of PCT Application NO. PCT/EP2022/050695 filed on Jan. 13, 2022 which claims priority to PCT Application NO. PCT/EP2021/052213 filed on Jan. 29, 2021 both of which are incorporated by reference herein in their entirety.

The present invention relates to heat-conducting silicone compositions, and to the production and use thereof.

PRIOR ART

Heat-conducting silicone compositions find wide use for heat management in the automobile and electronics industries. Examples of important presentation forms include heat-conducting adhesives, heat-conducting pads, gap fillers and encapsulation compounds. Of the applications mentioned, gap fillers for lithium ion batteries of electrical vehicles are by far the greatest application in terms of volume. Gap fillers are heat-conducting elastomers that completely and sustainably fill air gaps caused by manufacturing tolerances, differences in build height or different coefficients of expansion, and minimize thermal resistance, for example between electronic components and cooling jackets or heatsinks.

The prior art includes different thermally conductive fillers that are added to the silicone to increase its thermal conductivity. However, these have serious disadvantages. Ceramic fillers, for example aluminium oxide, have a very high density and hence increase the weight of the components very significantly. Moreover, they are comparatively costly. Metallic fillers, for example aluminium powders or silver powders, are electrically conductive, which is unacceptable for many applications. Many metals and alloys are additionally comparatively costly.

Many further fillers of high thermal conductivity, for example carbon nanotubes, boron nitride and aluminium nitride, on account of their comparatively high costs, can also be used only to a limited degree, or in small amounts or specific applications.

The prior art includes various heat-conducting silicone compositions containing silicon particles as heat-conducting filler. These are comparatively light and inexpensive. Moreover, silicon, being a semiconductor, has extremely low electrical conductivity. However, the silicon particles according to the prior art are unsuitable for use as a gap filler in lithium ion batteries for electrical vehicles:

The Si particles used in the prior art are usually obtained via grinding methods. A disadvantage is that such particles have a high surface area and bind a very large amount of polymer. This increases the viscosity of the silicone composition very significantly. It is possible to produce only mixtures having comparatively low filling levels and low thermal conductivity. In the case of higher filling levels, the composition becomes very stiff and can no longer be processed by conventional methods, for example dispensers. It is also found that silicone compositions containing ground silicon particles have comparatively high combustibility.

The use of silicon particles smaller than 20 mm is disadvantageous since such small particles have a comparatively low minimum ignition energy and hence present a dust explosion hazard and require complex and costly safety precautions in industrial processing.

JP2019131669A2 teaches the use of metallic Si particles of size 0.1-200 mm and having electrically insulating coating as thermally conductive fillers for siloxane-free organic resins. The particles can be produced via thermal breakdown or melting or grinding methods, or be obtained from polishing or grinding methods. The particles are provided with an electrically insulating coating in a separate process step. In the examples, JP2019131669A2 discloses organic resins containing up to 65% by volume of ground Si particles having an average particle size of 32 mm and having a thermal conductivity of up to 7 W/mK. A disadvantage is the use of ground particles having comparatively high combustibility. The vulcanizates disclosed are nonelastic and therefore unsuitable for use as a gap filler in lithium ion batteries.

US2016122611 teaches electrically and thermally conductive silicone elastomer compositions containing a thermally conductive filler smaller than 30 mm, more preferably 2 to 8 mm, in combination with a carbon black. The thermally conductive filler may be a silicon powder. What are disclosed in the examples are compositions containing up to 60% by weight of ground Si particles having an average particle size of 5 mm or up to 46% by weight of ground Si particles having an average particle size of 40 mm. The thermal conductivity of the compositions is up to 1.0 W/mK. A disadvantage is the use of ground particles that are of comparatively high combustibility and permit only compositions having a comparatively low filling level and low thermal conductivity.

US2007135555 teaches heat-crosslinking, thermally conductive silicone compositions containing spherical metallic Si particles that are produced via a melting method, or ground metallic Si particles, each having an average particle size of up to 100 mm, more preferably of 2 to 25 mm. What are disclosed in the examples are compositions containing up to 71% by weight of ground Si particles having an average particle size of 12 mm or up to 71% by weight of spherical Si particles having an average particle size of 5 mm, each in combination with oxidic fillers, for example $Fe_2O_3$ or $Al_2O_3$. The thermal conductivity of the compositions is up to 1.2 W/mK. A disadvantage is the use of very small Si particles that are comparatively highly combustible and permit only compositions having a comparatively low filling level and low thermal conductivity.

US2007117920 teaches heat-crosslinking, thermally conductive silicone compositions containing spherical or ground, metallic Si particles having an average particle size of 2 to 100 mm, more preferably 2 to 25 mm. What are disclosed in the examples are compositions containing up to 67% by weight of ground Si particles having an average particle size of 5 to 12 mm, as the sole filler or in combination with $Al_2O_3$. The viscosity of the mixtures is in the range from 30 000 to 260 000 mPa·s at a thermal conductivity of up to 1.0 W/mK. A disadvantage is the use of very small Si particles that are comparatively highly combustible and permit only compositions having comparatively high viscosity, low filling level and low thermal conductivity.

US2001051673 teaches heat-crosslinking, thermally conductive silicone elastomer compositions containing platelet-shaped particles having an average particle size of 0.1 to 350 mm or round particles having an average particle size of 0.1 to 50 mm, preferably 0.5 to 20 mm, composed of a magnetic silicon-containing Fe—Si alloy, preference being given to platelets. What are disclosed in the examples are compositions containing 30% by volume of spherical Fe—Si particles, consisting of 97% by weight of Fe and 3% by weight of Si, having an average particle size of 8 mm in combination with 40% by volume of $Al_2O_3$ particles. The thermal conductivity is 4.0 W/mK. A disadvantage is the use of very small Fe—Si particles having a very high iron content. As a result, the particles are electrically conductive, have a comparatively high density and are comparatively highly combustible. An additional disadvantage is the use of large amounts of $Al_2O_3$, which means that the density of the composition is very high.

U.S. Pat. No. 4,292,223 teaches crosslinkable, thermally conductive silicone elastomer compositions containing metallic particles, for example silicon, preference being given to alloys, having an average particle size of 40 to 300 mm. The particles may be of spherical or irregular shape, having a length-to-width ratio of up to 8 (corresponding to an aspect ratio (w/l) according to ISO 9276-6 of not less than 0.125). This results in a very broad definition of the possible particle form, since the particles can be either spherical, corresponding to a length-to-width ratio of 1, or rod-shaped, where the length may be greater by a factor of 8 than the width. What are disclosed are compositions containing 28% by weight of ground Si particles having an average particle size of 44 mm, without disclosure of the w/l ratio. A disadvantage is the use of ground particles, which are comparatively highly combustible. Moreover, ground particles have a comparatively high surface area, and therefore compositions containing ground particles have a comparatively high viscosity and are difficult to process. The cross-linked materials have low flexibility and are brittle.

US2006228542 describes thermally conductive elastomers containing two thermally conductive fillers of different size. The elastomer may be a silicone inter alia. The first thermally conductive filler is formed from an electrically insulating and thermally conductive ceramic. As one of several examples of a suitable ceramic material, "silicone" is mistakenly listed rather than "silica". But it is entirely clear to the person skilled in the art when reading this disclosure that what are actually meant are silica ceramics, since silicon metal is not a ceramic, but fused silica ceramics (i.e. $SiO_2$ ceramics) are very well known. The first thermally conductive filler additionally has a monomodal distribution and an average particle size of at least 20 mm. It is disclosed that the first filler particle is spheroidal or spherical, and may also be hollow. It has a preferred average particle size of 30 to 95 mm with a standard deviation of 15 to 40 mm. This is an extremely non-specific definition of the possible distribution range, and so the particles could have a very narrow or very broad distribution.

This is shown by way of example by the following observations: a standard deviation of 40 mm with an average particle size of 30 mm corresponds to a very broad grain size distribution, whereas a standard deviation of 15 mm with an average particle size of 95 mm corresponds to a very narrow grain size distribution. There are no teachings in US2006228542 as to the influence of the standard deviation of the grain size distribution of the filler on the properties of the elastomer.

It was therefore an object of the present invention to provide heat-conducting silicone elastomer compositions that do not show the abovementioned disadvantages of the prior art, and which combine the properties of low density, low costs and high thermal conductivity.

This object is achieved by the inventive crosslinkable heat-conducting silicone compositions (Y) which contain comparatively large Si particles having an average particle size of 30 to 150 mm, of predominantly rounded form, and which simultaneously have a particularly large or broad particle distribution range. Completely surprisingly, it was found in experiments that these inventive silicone compositions (Y) have distinctly reduced combustibility.

Si particles of "predominantly rounded" form in the context of the present invention are understood to mean those having a spherical to oval shape with smooth surfaces. They could also be referred to as potato-shaped.

Figure 1:
FIG. 1 shows, by way of example, the inventive, predominantly rounded shape of these Si particles. Noninventive Si particle shapes are shown by FIG. 2 with "spattered" particles, FIG. 3 with "nodular" particles, and FIG. 4 with "angular" and "sharp" particles. Inventive metallic Si particles are thus not spattered, nodular, or angular or sharp. But they may contain such particles to the degree of an impurity without disruption of their inventive effect.
Figure 2:
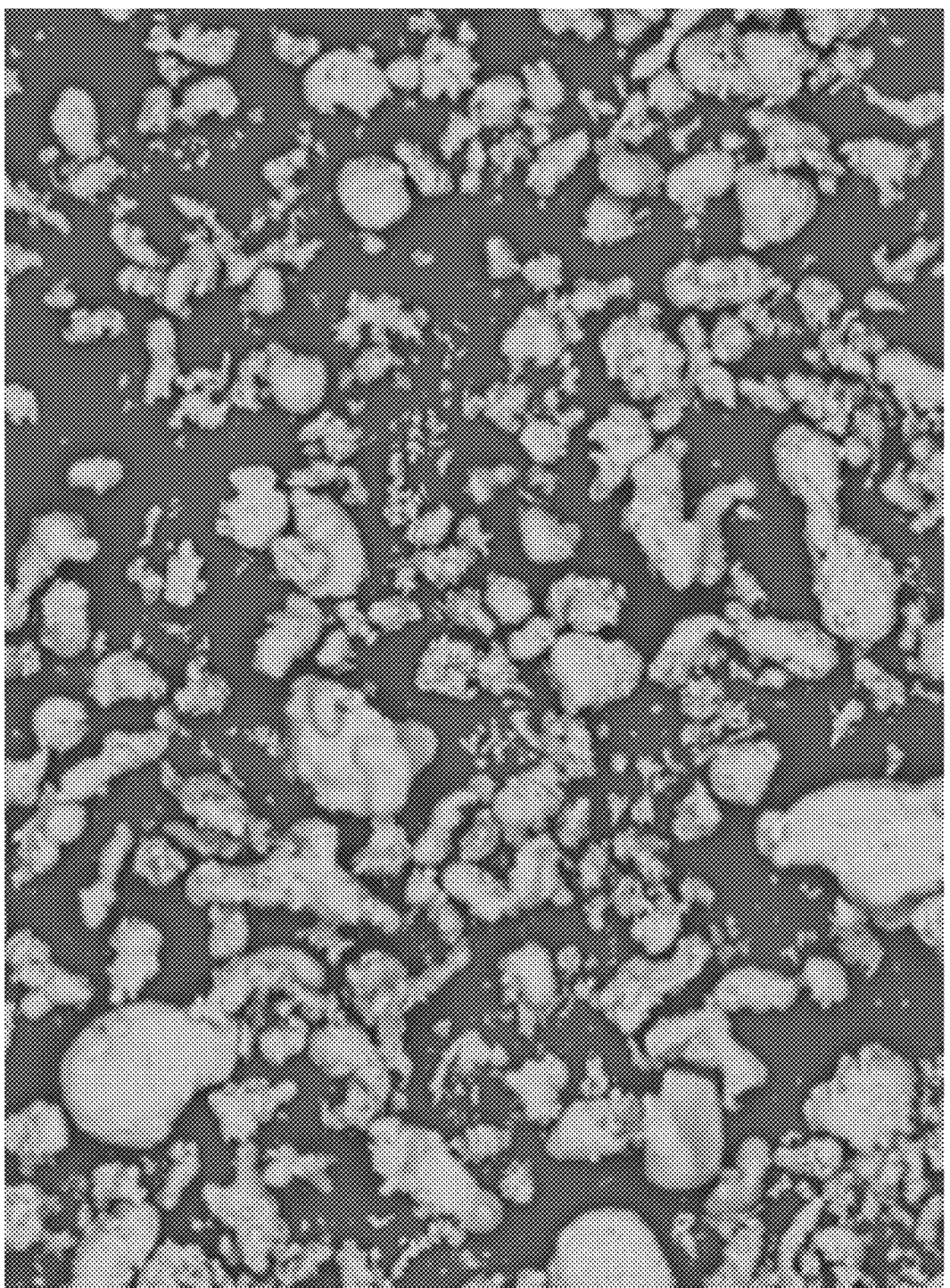
Figure 3:
Figure 4:
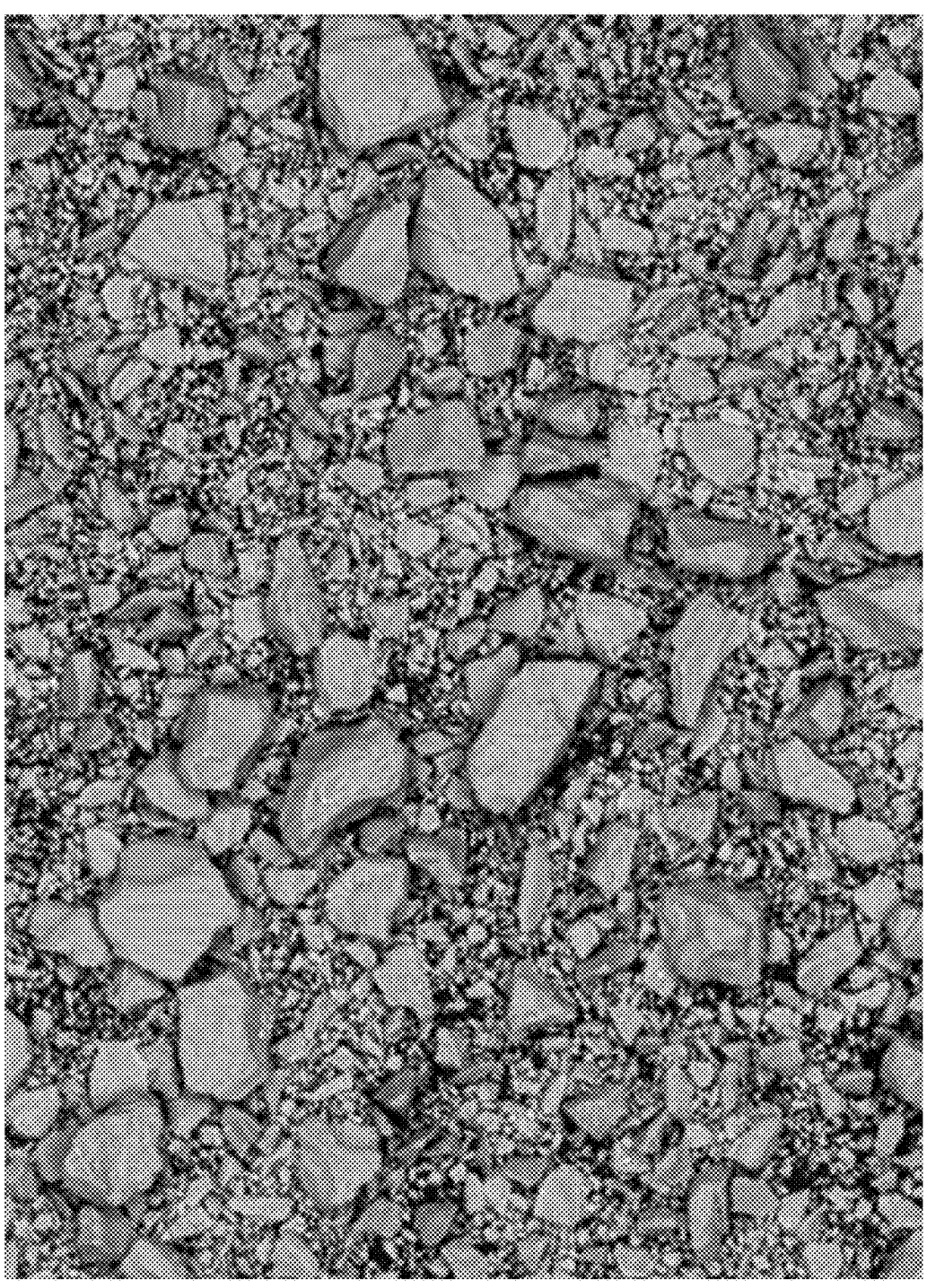

The properties of the Si particles according to FIGS. 1 to 4 are additionally shown in the following table.

| FIG. | X50 (mm) | w/l | SPHT | |
|------|----------|------|------|---------------|
| 1 | 98 | 0.84 | 0.87 | inventive |
| 2 | 38 | 0.68 | 0.70 | noninventive |
| 3 | 73 | 0.67 | 0.72 | noninventive |
| 4 | 37 | 0.67 | 0.76 | noninventive |

The present invention provides a crosslinkable, heat-conducting silicone composition (Y) comprising
   5-50% by volume of a crosslinkable silicone composition (S) and
   50-95% by volume of at least one thermally conductive filler (Z) having a thermal conductivity of at least 5 W/mK, with the proviso that
   the crosslinkable, heat-conducting silicone composition (Y) has a thermal conductivity of at least 0.6 W/mK, and that
   at least 20% by volume of metallic silicon particles present as thermally conductive fillers (Z) fulfil the following features:
      a) their median diameter x50 is in the range of 30-150 μm;
      b) they are predominately rounded, and characterized in that the width/length ratio (aspect ratio w/1) is at least 0.76;
      c) their distribution range SPAN ((x90−x10)/x50) is at least 0.40;
      d) they contain at most 1.5% by weight of silicon particles smaller than 2 μm.
   In the context of this invention, the terms "heat-conducting" and "thermally conductive" are equivalent.

Thermally conductive fillers (Z) in the context of this invention are understood to mean any fillers having a thermal conductivity of at least 5 W/mK.

Heat-conducting silicone composition (Y) in the context of this invention is understood to mean those silicone compositions that distinctly surpass the thermal conductivity of a filler- and additive-free polydimethylsiloxane, typically about 0.2 W/mK, characterized in that they have a thermal conductivity of at least 0.6 W/mK.

In the context of this invention, all parameters that describe particle size (parameter: median diameter x50), particle size distribution (parameters: standard deviation sigma and distribution range SPAN) or particle shape (parameters: aspect ratio w/l and sphericity SPHT) are based on a volume-based distribution. The indices mentioned may be determined, for example, by means of dynamic image analysis according to ISO 13322-2 and ISO 9276-6, for example with a Camsizer X2 from Retsch Technology.

The person skilled in the art is aware that standard deviation is not standardized and is a viable characteristic for assessment of particle size distribution of different samples only when the average particle sizes of the comparative samples are about the same. For description of the relative breadth of the particle size distribution in the context of this invention, therefore, the particle size distribution range weighted by the median particle size x50 is used, the dimensionless distribution range SPAN defined as:

$$SPAN = (x90 - x10)/x50.$$

Aspect ratio serves as an index for description of the particle shape. The earlier prior art frequently describes the aspect ratio in terms of the ratio of length to width (1/w). This results in values of not less than 1. In the more recent literature, for example according to ISO 9276-6, the aspect ratio is calculated from the reciprocal ratio of width to length (w/1). This results in values of not more than 1. The two indices can be interconverted by forming the reciprocal. In the context of this invention, aspect ratio is defined as the ratio of width to length (w/1) of the particle. Particle width is given here by $x_{c\ min}$, the smallest of all the maximum chords measured in the particle projection, and particle length is given by $x_{Fe\ max}$, the longest Feret diameter of all Feret diameters measured in a particle. More detailed information can be found, for example, in "Operating Instructions/Manual Particle Size Analysis System CAMSIZER®", Retsch Technology GmbH, 42781 Haan; Doc. No. CAM-SIZER V0115. This results in the following formula for aspect ratio:

$$w/l = x_{c\ min}/x_{Fe\ max}$$

Sphericity SPHT is calculated from the projection area A of the particle being analysed relative to the area of a circle having the same circumference P of the projected particle according to the following formula (more detailed information can be found, for example, in "Operating Instructions/Manual Particle Size Analysis System CAMSIZER®", Retsch Technology GmbH, 42781 Haan; Doc. No. CAM-SIZER V0115):

$$SPHT = 4\ pA/P^2$$

The index SPHT corresponds to the square of the circularity C according to ISO 9276-6.

In order not to create an excessive number of pages in the description of the present invention, only the preferred embodiments of the individual features are detail hereinafter.

However, the expert reader will explicitly understand this manner of disclosure such that any combination of different levels of preference is thus also explicitly disclosed and explicitly desired.

Crosslinkable Silicone Composition (S)

As crosslinkable silicone composition (S), it is possible to use silicones known to the person skilled in the art from the prior art, such as addition-crosslinking, peroxide-crosslinking, condensation-crosslinking or radiation-crosslinking silicone compositions (S). Preference is given to using addition-crosslinking or peroxide-crosslinking silicone compositions (S).

Peroxide-crosslinking silicone compositions (S) have long been known to the person skilled in the art. In the simplest case, they contain at least one organopolysiloxane having at least 2 crosslinkable groups per molecule, for example methyl or vinyl groups, and at least one suitable organic peroxide catalyst. If the compositions according to the invention are crosslinked by means of free radicals, crosslinking agents used are organic peroxides that serve as a source of free radicals. Examples of organic peroxides are acyl peroxides, such as dibenzoyl peroxide, bis(4-chlorobenzoyl) peroxide, bis(2,4-dichlorobenzoyl) peroxide and bis(4-methylbenzoyl) peroxide; alkyl peroxides and aryl peroxides, such as di-tert-butyl peroxide, 2,5-bis(tert-butylperoxy)-2,5-dimethylhexane, dicumyl peroxide and 1,3-bis(tert-butylperoxyisopropyl)benzene; perketals, such as 1,1-bis(tert-butylperoxy)-3,3,5-trimethylcyclohexane; peresters, such as diacetyl peroxydicarbonate, tert-butyl perbenzoate, tert-butyl peroxy-isopropylcarbonate, tert-butyl peroxyisononanoate, dicyclohexyl peroxydicarbonate and 2,5-dimethylhexane 2,5-diperbenzoate.

It is possible to use one kind of organic peroxide; it is also possible to use a mixture of at least two different kinds of organic peroxides.

Particular preference is given to using addition-crosslinking silicone compositions (S).

Addition-crosslinking silicone compositions (S) used in accordance with the invention are known in the prior art and in the simplest case contain (A) at least one linear compound having radicals with aliphatic carbon-carbon multiple bonds, (B) at least one linear organopolysiloxane having Si-bonded hydrogen atoms, or, instead of (A) and (B), (C) at least one linear organopolysiloxane having SiC-bonded radicals with aliphatic carbon-carbon multiple bonds and Si-bonded hydrogen atoms, and (D) at least one hydrosilylation catalyst.

The addition-crosslinking silicone compositions (S) may be one-component silicone compositions or else two-component silicone compositions.

In two-component silicone compositions (S), the two components of the addition-crosslinking silicone compositions (S) according to the invention may contain all constituents in any combination, generally with the proviso that one component does not simultaneously contain siloxanes having an aliphatic multiple bond, siloxanes with Si-bonded hydrogen and catalyst, i.e. essentially does not simultaneously contain constituents (A), (B) and (D) or (C) and (D).

As is well known, the compounds (A) and (B) or (C) that are used in the addition-crosslinking silicone compositions (S) according to the invention are chosen such that crosslinking is possible. For example, compound (A) has at least two aliphatically unsaturated radicals and (B) at least three Si-bonded hydrogen atoms, or compound (A) has at least three aliphatically unsaturated radicals and siloxane (B) at least two Si-bonded hydrogen atoms, or else, rather than compound (A) and (B), siloxane (C) having aliphatically unsaturated radicals and Si-bonded hydrogen atoms in the abovementioned ratios is used. Also possible are mixtures of (A) and (B) and (C) having the abovementioned ratios of aliphatically unsaturated radicals and Si-bonded hydrogen atoms.

The addition-crosslinking silicone composition (S) according to the invention typically contains 30-99.0% by weight, preferably 40-95% by weight and more preferably 50-90% by weight of (A). The addition-crosslinking silicone composition (S) according to the invention typically contains 1-70% by weight, preferably 3-50% by weight and more preferably 8-40% by weight of (B). If the addition-crosslinking silicone composition according to the invention contains component (C), typically at least 30% by weight, preferably at least 45% by weight, more preferably at least 58% by weight of (C), based on the total amount of addition-crosslinking silicone composition (S) according to the invention is present.

Compound (A) used in accordance with the invention may comprise silicon-free organic compounds having preferably at least two aliphatically unsaturated groups, and organosilicon compounds having preferably at least two aliphatically unsaturated groups, or else mixtures thereof.

Examples of silicon-free organic compounds (A) are 1,3,5-trivinylcyclohexane, 2,3-dimethyl-1,3-butadiene, 7-methyl-3-methylene-1,6-octadiene, 2-methyl-1,3-butadiene, 1,5-hexadiene, 1,7-octadiene, 4,7-methylene-4,7,8,9-tetrahydroindene, methylcyclopentadiene, 5-vinyl-2-norbornene, bicyclo[2.2.1]hepta-2,5-diene, 1,3-diisoproppenylbenzene, polybutadiene containing vinyl groups, 1,4-divinylcyclohexane, 1,3,5-triallylbenzene, 1,3,5-trivinylbenzene, 1,2,4-trivinylcyclohexane, 1,3,5-triisopropenylbenzene, 1,4-divinylbenzene, 3-methyl-1,5-heptadiene, 3-phenyl-1,5-hexadiene, 3-vinyl-1,5-hexadiene and 4,5-dimethyl-4,5-diethyl-1,7-octadiene, N,N'-methylenebisacrylamide, 1,1,1-tris(hydroxymethyl)propane triacrylate, 1,1,1-tris(hydroxymethyl)propane trimethacrylate, tripropylene glycol diacrylate, diallyl ether, diallylamine, diallyl carbonate, N,N'-diallylurea, triallylamine, tris(2-methylallyl)amine, 2,4,6-triallyloxy-1,3,5-triazine, triallyl-s-triazine-2,4,6(1H,3H,5H)-trione, diallyl malonate, polyethylene glycol diacrylate, polyethylene glycol dimethacrylate, poly(propylene glycol) methacrylate.

The addition-crosslinking silicone compositions (S) according to the invention preferably contain, as constituent (A), at least one aliphatically unsaturated organosilicon compound, it being possible to use any of the aliphatically unsaturated organosilicon compounds used to date in addition-crosslinking compositions, for example silicone block copolymers having urea segments, silicone block copolymers having amide segments and/or imide segments and/or ester amide segments and/or polystyrene segments and/or silarylene segments and/or carborane segments and silicone graft copolymers having ether groups.

Organosilicon compounds (A) used that have SiC-bonded radicals having aliphatic carbon-carbon multiple bonds are preferably linear or branched organopolysiloxanes composed of units of the general formula (I)

$$R_a^4 R_b^4 SiO_{(4-a-b)/2} \qquad (I)$$

where

R$^4$ are independently the same or different and are an organic or inorganic radical free of aliphatic carbon-carbon multiple bonds, R$^5$ are independently the same or different and are a monovalent, substituted or unsubstituted, SiC-bonded hydrocarbyl radical having at least one aliphatic carbon-carbon multiple bond, a is 0, 1, 2 or 3, and b is 0, 1 or 2, with the proviso that the sum total of a+b is not more than 3 and there are at least 2 R$^5$ radicals per molecule.

R$^4$ radical may be mono- or polyvalent radicals, where the polyvalent radicals, for example bivalent, trivalent or tetravalent radicals, may then connect multiple, for instance two, three or four, siloxy units of the formula (I) to one another.

Further examples of R$^4$ are the monovalent radicals —F, —Cl, —Br, OR$^6$, —CN, —SCN, —NCO and SiC-bonded, substituted or unsubstituted hydrocarbyl radicals, which may be interrupted by oxygen atoms or the —C(O)— group, and divalent radicals Si-bonded at either end as per formula (I). If R$^4$ radical comprises SiC-bonded, substituted hydrocarbyl radicals, preferred substituents are halogen atoms, phosphorus-containing radicals, cyano radicals, —OR$^6$, —NR$^6$—, —NR$^6_2$, —NR$^6$—C(O)—NR$^6_2$, —C(O)—NR$^6_2$, —C(O)R$^6$, —C(O)OR$^6$, —SO$_2$-Ph and —C$_6$F$_5$. R$^6$ here is independently the same or different and is a hydrogen atom or a monovalent hydrocarbyl radical having 1 to 20 carbon atoms and Ph is the phenyl radical.

Examples of R$^4$ radicals are alkyl radicals, such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical, cycloalkyl radicals, such as cyclopentyl, cyclohexyl, cycloheptyl and methylcyclohexyl radicals, aryl radicals, such as the phenyl, naphthyl, anthryl and phenanthryl radical, alkaryl radicals, such as o-, m-, p-tolyl radicals, xylyl radicals and ethylphenyl radicals, and aralkyl radicals, such as the benzyl radical, the α- and the β-phenylethyl radical.

Examples of substituted R$^4$ radicals are haloalkyl radicals, such as the 3,3,3-trifluoro-n-propyl radical, the 2,2,2,2',2'-hexafluoroisopropyl radical, the heptafluoroisopropyl radical, haloaryl radicals, such as the o-, m- and p-chlorophenyl radical, —(CH$_2$)—N(R$^6$)C(O)NR$^6_2$, —(CH$_2$)$_o$—C(O)NR$^6_2$, —(CH$_2$)$_o$—C(O)R$^6$, —(CH$_2$)$_o$—C(O)OR$^6$, —(CH$_2$)$_o$—C(O)NR$^6_2$, —(CH$_2$)—C(O)—(CH$_2$)$_p$C(O)CH$_3$, —(CH$_2$)—O—CO—R$^6$, —(CH$_2$)—NR$^6$—(CH$_2$)$_p$—NR$^6_2$, —(CH$_2$)$_o$—O—(CH$_2$)$_p$CH(OH)CH$_2$OH, —(CH$_2$)$_o$(OCH$_2$CH$_2$)$_p$OR$^6$, —(CH$_2$)$_o$—SO$_2$-Ph and —(CH$_2$)$_o$—O—C$_6$F$_5$, where R$^6$ and Ph conform to the definition given above and o and p are identical or different integers between 0 and 10.

Examples of R$^4$ as divalent radicals Si-bonded at either end as per formula (I) are those that derive from the monovalent examples given above for R$^4$ radical in that there is an additional bond through substitution of a hydrogen atom, examples of such radicals are —(CH$_2$)—, —CH(CH$_3$)—, —C(CH$_3$)$_2$—, —CH(CH$_3$)—CH$_2$—, —C$_6$H$_4$—, —CH(Ph)-CH$_2$—, —C(CF$_3$)$_2$—, —(CH$_2$)$_o$—C$_6$H$_4$—(CH$_2$)$_o$—, —(CH$_2$)$_o$—C$_6$H$_4$—C$_6$H$_4$—(CH$_2$)$_o$—, —(CH$_2$O)$_p$, (CH$_2$CH$_2$O)$_o$, —(CH$_2$)$_o$—O$_x$—C$_6$H$_4$—SO$_2$—C$_6$H$_4$—O$_x$—(CH$_2$)$_o$—, where x is 0 or 1, and Ph, o and p have the definition given above.

R$^4$ radical is preferably a monovalent SiC-bonded, optionally substituted hydrocarbyl radical which is free of aliphatic carbon-carbon multiple bonds and has 1 to 18 carbon atoms, more preferably a monovalent SiC-bonded hydrocarbyl radical which is free of aliphatic carbon-carbon multiple bonds and has 1 to 6 carbon atoms, especially the methyl or phenyl radical.

$R^5$ radical may be any groups amenable to an addition reaction (hydrosilylation) with an SiH-functional compound.

If $R^5$ radical comprises SiC-bonded, substituted hydrocarbyl radicals, preferred substituents are halogen atoms, cyano radicals and —$OR^6$, where $R^6$ has the definition given above.

$R^5$ radical preferably comprises alkenyl and alkynyl groups having 2 to 16 carbon atoms, such as vinyl, allyl, methallyl, 1-propenyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl and styryl radicals, particular preference being given to using vinyl, allyl and hexenyl radicals.

The molecular weight of constituent (A) may vary within wide limits, for instance between $10^2$ and $10^6$ g/mol. For example, constituent (A) may be an alkenyl-functional oligosiloxane of relatively low molecular weight, such as 1,2-divinyltetramethyldisiloxane, but also a high-polymeric polydimethylsiloxane having Si-bonded vinyl groups in chain or terminal positions, for example having a molecular weight of $10^5$ g/mol (number average determined by means of NMR). Nor is the structure of the molecules that form constituent (A) fixed, more particularly, the structure of a macromolecular, i.e. oligomeric or polymeric, siloxane may be linear, cyclic, branched or else resinous and network-like. Linear and cyclic polysiloxanes are preferably composed of units of the formula $R^4_3SiO_{1/2}$, $R^5R^4_2SiO_{1/2}$, $R^5R^4SiO_{1/2}$ and $R^4_2SiO_{2/2}$, where $R^4$ and $R^5$ have the definition given above. Branched and network-like polysiloxanes additionally contain trifunctional and/or tetrafunctional units, preference being given to those of the formulae $R^4SiO_{3/2}$, $R^5SiO_{3/2}$ and $SiO_{4/2}$. It is of course also possible to use mixtures of different siloxanes that meet the criteria of constituent (A).

Particularly preferred as component (A) is the use of vinyl-functional, essentially linear polydiorganosiloxanes having a viscosity of 10 to 100 000 mPa·s, more preferably of 15 to 20 000 mPa·s, especially preferably 20 to 2000 mPa·s, in each case at 25° C.

As organosilicon compound (B), it is possible to use any hydrogen-functional organosilicon compounds that have also been used to date in addition-crosslinkable compositions.

Organopolysiloxanes (B) having Si-bonded hydrogen atoms that are used are preferably linear, cyclic or branched organopolysiloxanes composed of units of the general formula (III)

$$R^4_cH_dSiO_{(4-c-d)/2} \tag{III}$$

where

R$^4$ has the definition given above, c is 0, 1, 2 or 3 and d is 0, 1 or 2, with the proviso that the sum total of c+d is not more than 3 and there are at least two Si-bonded hydrogen atoms per molecule. There is preferably at least one organopolysiloxane (B) having at least three, more preferably at least four, Si-bonded hydrogen atoms per molecule.

The organopolysiloxane (B) used in accordance with the invention preferably contains Si-bonded hydrogen in the range from 0.01 to 1.7 percent by weight (% by weight), based on the total weight of the organopolysiloxane (B), preferably in the range of 0.02-0.8% by weight, more preferably in the range of 0.03-0.3% by weight.

The molecular weight of constituent (B) may likewise vary within wide limits, for instance between $10^2$ and $10^6$ g/mol. For example, constituent (B) may be an SiH-functional oligosiloxane of relatively low molecular weight, such as tetramethyldisiloxane, but also a high-polymeric polydimethylsiloxane having SiH groups in chain or terminal positions or a silicone resin having SiH groups.

Nor is the structure of the molecules that form constituent (B) fixed, more particularly, the structure of a macromolecular, i.e. oligomeric or polymeric, SiH-containing siloxane may be linear, cyclic, branched or else resinous and network-like. Linear and cyclic polysiloxanes (B) are preferably composed of units of the formula $R^4_3SiO_{1/2}$, $HR^4_2SiO_{1/2}$, $HR^4SiO_{2/2}$ and $R^4_2SiO_{2/2}$, where $R^4$ has the definition given above.

Branched and network-like polysiloxanes additionally contain trifunctional and/or tetrafunctional units, preference being given to those of the formulae $R^4SiO_{3/2}$, $HSiO_{3/2}$ and $SiO_{4/2}$, where $R^4$ has the definition given above.

It is of course also possible to use mixtures of different siloxanes that meet the criteria of constituent (B). Particular preference is given to the use of low molecular weight SiH-functional compounds such as tetrakis(dimethylsiloxy) silane and tetramethylcyclotetrasiloxane, and also of SiH-containing siloxanes of higher molecular weight, such as poly(hydromethyl)siloxane and poly(dimethylhydromethyl) siloxane, or analogous SiH-containing compounds in which some of the methyl groups have been replaced by 3,3,3-trifluoropropyl or phenyl groups.

Particularly preferred, as constituent (B), is the use of SiH-containing, essentially linear poly(hydromethyl)siloxanes and poly(dimethylhydromethyl)siloxanes having a viscosity in the range from 1 to 100 000 mPa·s, preferably in the range of 2 to 1000 mPa·s, more preferably in the range of 3 to 750 mPa·s, especially preferably in the range of 5 to 500 mPa·s, in each case at 25° C.

Constituent (B) is preferably present in the crosslinkable silicone compositions (S) according to the invention in such an amount that the molar ratio of SiH groups to aliphatically unsaturated groups from (A) is 0.1 to 10, more preferably between 0.5 and 5.0, especially between 0.5 and 3.

In an especially preferred embodiment, the addition-crosslinking silicone composition (S) according to the invention contains at least one, preferably linear, organopolysiloxane (B) having at least three, more preferably at least four, Si-bonded hydrogen atoms per molecule, and simultaneously at least one linear polydimethylsiloxane (B) having Me$_2$Si—H termination at either end where preferably at least 50% by weight of a linear polydimethylsiloxane (B) having Me$_2$Si—H termination at either end is present, based on the total amount of organopolysiloxane (B).

Components (A) and (B) used in accordance with the invention are commercial products or preparable by standard chemical processes.

Rather than components (A) and (B), the silicone compositions (S) according to the invention may contain organopolysiloxanes (C) simultaneously containing aliphatic carbon-carbon multiple bonds and Si-bonded hydrogen atoms. It is also possible for the silicone compositions (S) according to the invention to contain all three components (A), (B) and (C).

If siloxanes (C) are used, these are preferably those composed of units of the general formulae (IV), (V) and (VI)

$$R_f^4 SiO_{4/2} \quad \text{(IV)}$$

$$R_g^4 R^5 SiO_{3-g/2} \quad \text{(V)}$$

$$R_h^4 HSiO_{3-h/2} \quad \text{(VI)}$$

where

R$^4$ and R$^5$ have the definition given above, f is 0, 1, 2 or 3, g is 0, 1 or 2 and h is 0, 1 or 2, with the proviso that there are at least 2 R$^5$ radicals and at least 2 Si-bonded hydrogen atoms per molecule.

Examples of organopolysiloxanes (C) are those composed of SO$_{4/2}$, R$^4_3$SiO$_{1/2}$, R$^4_2$R$^5$SiO$_{1/2}$ and R$^4_2$HSiO$_{1/2}$ units, called MP resins, where these resins may additionally contain R$^4$SiO$_{3/2}$ and R$^4_2$SiO units, and linear organopolysiloxanes consisting essentially of R$^4_2$R$^5$SiO$_{1/2}$, R$^4_2$SiO and R$^4$HSiO units with R$^4$ and R$^5$ as defined above.

The organopolysiloxanes (C) preferably have an average viscosity of 0.01 to 500 000 Pa·s, more preferably 0.1 to 100 000 Pa·s, in each case at 25° C. Organopolysiloxanes (C) are preparable by standard chemical methods.

As hydrosilylation catalyst (D), it is possible to use any of the heat- or UV-curing catalysts known from the prior art. Component (D) may be a platinum group metal, for example platinum, rhodium, ruthenium, palladium, osmium or iridium, an organometallic compound or a combination thereof. Examples of component (D) are compounds such as hexachloroplatinum(IV) acid, platinum dichloride, platinum acetylacetonate and complexes of said compounds encapsulated in a matrix or a core/shell-type structure. The platinum complexes having low molecular weight of the organopolysiloxanes include 1,3-diethenyl-1,1,3,3-tetramethyldisiloxane complexes with platinum. Further examples are platinum-phosphite complexes or platinum-phosphine complexes. For light- or UV-curing compositions, it is possible, for example, to use alkyl-platinum complexes such as derivatives of cyclopentadienyltrimethylplatinum(IV), cyclooctadienyldimethylplatinum(II) or diketonato complexes, for example bisacetylacetonatoplatinum(II), in order to initiate the addition reaction with the aid of light. These compounds may be encapsulated in a resin matrix.

The concentration of component (D) is sufficient for catalysing the hydrosilylation reaction of components (A) and (B) and (C) on contact, in order to produce the heat required here in the process described. The amount of component (D) may be between 0.1 and 1000 parts per million (ppm), 0.5 and 100 ppm or 1 and 25 ppm of the platinum group metal, according to the total weight of the components. The curing rate may be low when the constituent of the platinum group metal is below 1 ppm. The use of more than 100 ppm of the platinum group metal is uneconomic or lowers the storage stability of the silicone composition.

The addition-crosslinking silicone compositions (S) may optionally contain all further additives that have also been used to date for production of addition-crosslinkable compositions. Examples of actively reinforcing fillers (E) not covered by the definition of the thermally conductive fillers (Z) that may be used as a component in the addition-crosslinking silicone compositions (Y) according to the invention are fumed or precipitated silicas having BET surface areas of at least 50 m$^2$/g, and carbon blacks and activated carbons such as furnace black and acetylene black, preference being given to fumed and precipitated silicas having BET surface areas of at least 50 m$^2$/g.

The silica fillers (E) mentioned may have hydrophilic character or have been hydrophobized by known methods. Preferred fillers (E), as a result of a surface treatment, have a carbon content of at least 0.01% to a maximum of 20% by weight, preferably between 0.1% and 10% by weight, more preferably between 0.5% to 6% by weight.

In the addition-crosslinking silicone composition (S) according to the invention, constituent (E) is preferably used in the form of a single finely divided filler or likewise preferably as a mixture of two or more thereof. The content of actively reinforcing filler in the crosslinkable silicone compositions (S) according to the invention is in the range from 0% to 50% by weight, preferably 0% to 30% by weight, more preferably 0% to 10% by weight.

The crosslinkable addition-crosslinking silicone compositions (S) are more preferably characterized in that the filler (E) has been surface-treated. The surface treatment is achieved by the methods known in the prior art for hydrophobization of finely divided fillers.

The addition-crosslinking silicone composition (S) according to the invention may contain alkyltrialkoxysilanes (F) as further additions in order to reduce the viscosity thereof. If they are present, they are preferably present to an extent of 0.1-8% by weight, preferably 0.2-6% by weight, based on the total mass of silicone composition (S), where the alkyl group may be a saturated or unsaturated, linear or branched alkyl group having 2 to 20, preferably 8-18, carbon atoms, and the alkoxy groups may have 1 to 5 carbon atoms. Examples of the alkoxy groups include methoxy groups, ethoxy groups, propoxy groups and butoxy groups, particular preference being given to methoxy groups and ethoxy groups. Especially preferred for (F) is n-octyltrimethoxysilane, n-dodecyltrimethoxysilane, n-hexadecyl-trimethoxysilane and n-octadecyltrimethoxysilane.

The addition-crosslinking silicone composition (S) according to the invention may optionally contain, as constituents, further additions in a proportion of up to 70% by weight, preferably up to 42% by weight, based in each case on the addition-crosslinking silicone composition (S) according to the invention, these being different from the thermally conductive fillers (Z) according to the invention and the additions (E) and (F). These additions may, for example, be inactive fillers, resinous polyorganosiloxanes other than the siloxanes (A), (B) and (C), non-reinforcing fillers, fungicides, fragrances, rheological additives, corrosion inhibitors, oxidation inhibitors, light stabilizers, flame retardants and compositions for influencing electrical properties, dispersing aids, solvents, adhesion promoters, pigments, dyes, plasticizers, organic polymers, heat stabilizers etc.

Thermally Conductive Filler (Z)

The crosslinkable heat-conducting silicone composition (Y) according to the invention contains at least one thermally conductive filler (Z) having a thermal conductivity of at least 5 W/mK, with the proviso that the crosslinkable heat-conducting silicone compositions (Y) contain at least 20% by volume of metallic silicon particles as thermally conductive fillers (Z) that still have to fulfil at least the further specific features a) to d), and the total amount of thermally conductive fillers (Z) is at least 50% by volume.

a) The median diameter x50 of these metallic silicon particles (Z) according to the invention is in the range of 30-150 μm, preferably in the range of 30-140 μm, more preferably in the range of 40-130 μm, particularly preferably in the range of 50-125 μm, especially in the range of 60-120 μm.

b) The metallic silicon particles (Z) according to the invention are predominantly rounded and are preferably produced by a melting method. The predominantly rounded shape of the particles according to the invention is characterized in that the width/length ratio (aspect ratio w/1) is at least 0.76, preferably at least 0.77, more preferably at least 0.78, especially at least 0.79.

The silicon particles (Z) according to the invention preferably have a sphericity value SPHT of at least 0.75, preferably at least 0.76, more preferably at least 0.78, especially preferably of at least 0.79.

In an especially preferred embodiment, the silicon particles (Z) according to the invention have an aspect ratio of at least 0.76 and simultaneously a sphericity value SPHT of at least 0.75, preferably at least 0.76, more preferably at least 0.78, especially preferably of at least 0.79.

c) The distribution range of the particle size (SPAN) is defined as SPAN=(x90−x10)/x50. The SPAN of the metallic silicon particles (Z) according to the invention is at least 0.4, preferably at least 0.5, more preferably at least 0.6, especially preferably at least 0.7. In a preferred embodiment, the SPAN is between 0.7 and 2.5, especially between 0.75 and 2.

It is immaterial here whether a single fraction of silicon particles (Z) having a SPAN within the range according to the invention is used, or whether two or more fractions of silicon particles are mixed and hence the inventive particle size distribution range according to feature c) of the inventive silicon particles (Z) is achieved. If two or more fractions of silicon particles are mixed, this may precede the mixing with one or more components of the composition according to the invention, or the fractions of silicon particles may also be mixed separately from one another with one or more components of the composition according to the invention. The sequence of addition here does not matter.

Preferably not more than four fractions of silicon particles are mixed so as to achieve the distribution range according to the invention, preferably not more than three fractions of silicon particles are mixed so as to achieve the distribution range according to the invention, more preferably not more than two fractions of silicon particles according to the invention are used so as to achieve the distribution range according to the invention, and especially preferably just a single silicon powder according to the invention is used.

d) The inventive silicon particles (Z) contain at most 1.5% by weight of silicon particles smaller than 2 μm, preferably at most 1% by weight, more preferably at most 0.5% by weight, based in each case on the total amount of silicon particles. Particularly preferred silicon particles are essentially free of particle fractions smaller than 2 μm.

The silicon particles (Z) according to the invention preferably contain less than 20% by weight, preferably less than 15% by weight, more preferably less than 10% by weight, of a particle fraction having a diameter of less than or equal to 20 μm, based in each case on the total amount of silicon particles.

The silicon particles (Z) according to the invention preferably contain less than 15% by weight, preferably less than 10% by weight, more preferably less than 5% by weight, of a particle fraction having a diameter of less than or equal to 10 μm, based in each case on the total amount of silicon particles.

In an especially preferred embodiment, there is no intended addition of silicon particles having an average diameter of less than or equal to 10 μm. Preferably, no silicon particles smaller than or equal to 15 μm are added. Especially preferably, there is no intended addition of silicon particles having an average diameter of less than or equal to 20 μm.

The use of silicon particles smaller than 20 μm is disadvantageous since such small particles have a comparatively low minimum ignition energy and hence present a dust explosion hazard and require complex and costly safety precautions in industrial processing. Moreover, gap fillers which contain such finely divided aluminum particles do not achieve the required fire performance according to UL94 V-0. Another disadvantage of very fine silicon particles or ground silicon particles is that such particles have a comparatively high surface area and bind a very large amount of polymer. This very significantly increases the viscosity of the silicone composition. It is only possible to produce mixtures having comparatively low filling levels and hence low thermal conductivity. In the case of higher filling levels, the composition becomes very stiff and can no longer be processed by conventional methods, for example dispensers. It is also found that silicone compositions containing ground silicon particles have comparatively high combustibility.

Metallic silicon has multiple very advantageous properties for use as a thermally conductive filler (Z). For example, the exceptionally high thermal conductivity of silicon particles (Z) improves the thermal conductivity of the thermally conductive silicone composition (Y) produced therefrom. The low density of the silicon particles (Z) reduces the weight of the composition and of the components produced therefrom and helps to save costs. The low electrical conductivity enables the production of electrically insulating components and improves electrical breakdown resistance. The low Mohs hardness of the silicon particles (Z) reduces abrasion in the course of processing. It will be clear to the person skilled in the art that the advantages mentioned are wholly or partly lost with decreasing purity of the silicon. The purity of the silicon particles (Z) according to the invention and hence the silicon content is at least 80%, preferably at least 90%, more preferably at least 95%.

It is also apparent to the person skilled in the art that metallic silicon particles are combustible under particular conditions and the dusts present an explosion risk. The person skilled in the art is also aware that the risk of dust formation, combustibility and explosion risk associated with metal powders increases significantly with decreasing particle size. For that reason, very small silicon particles below 30 μm are unsuitable for many applications, for example as filler for gap fillers in lithium ion batteries. Such particles, on account of the low minimum ignition energy, are hazardous to handle and require complex and costly safety precautions in industrial processing. It has also been found that compositions containing very small silicon particles below 30 μm are comparatively highly combustible and do not meet the UL94 V-0 combustibility class for gap fillers in lithium ion batteries.

Larger silicon particles having an average particle size exceeding 30 μm have a comparatively high minimum ignition energy and are therefore more safely and easily processible in industrial processes. Nevertheless, compositions containing noninventive ground, angular silicon particles larger than 30 μm were found to be comparatively highly combustible and did not meet the UL94 V-0 combustibility class for gap fillers in lithium ion batteries.

Silicon particles having an average particle size exceeding 150 μm are unsuitable for many applications of heat-conducting silicone compositions since such large-grain silicon particles frequently do not fit into the fine gaps that have to be filled with gap fillers, for example. Moreover, it is found that such large-grain silicon particles also show comparatively high combustibility.

The use of spherical fillers for improving flowability and processibility of filled polymers is sufficiently well known in the prior art. However, there are only a few prior art documents in which spherical silicon particles are used in thermally conductive silicone compositions. The compositions disclosed contain exclusively very small spherical silicon particles having an average particle size of less than 25 mm, the disadvantages of which have been described.

It has been found, completely surprisingly, that the crosslinkable silicone compositions (Y) according to the invention are thermally conductive and simultaneously of low combustibility when they contain metallic silicon particles according to the invention that simultaneously fulfil features a) to d), in the required minimum amounts.

The crosslinkable silicone composition (Y) according to the invention contains at least 20% by volume of such metallic silicon particles (Z), preferably at least 25% by volume, more preferably at least 30% by volume, especially preferably at least 35% by volume. If the silicone composition (Y) contains smaller amounts of metallic silicon particles (Z), the desired advantageous effects of the metallic silicon, for example the low density and high thermal conductivity, are no longer sufficiently provided.

The prior art includes various methods of producing finely divided metal particles with a rounded shape. The silicon particles (Z) according to the invention are preferably produced from a molten state, as a result of which they have a comparatively smooth surface and are essentially free of fractures, sharp edges and pointed corners. In this way, they differ from conventional ground particles that have been converted to the final form, for example, by means of crushing, grinding or milling. It is immaterial here whether the particles are comminuted cold in a first process step, for example by grinding, and then converted to a molten form by heating above the melting point, for example by heat treatment in a hot zone, for example by means of a plasma, or whether a silicon melt is first produced and then comminuted, for example by atomizing. The silicon particles according to the invention are preferably converted to the solid form according to the invention by spraying or atomizing of a silicon melt, followed by cooling.

Suitable methods of producing the silicon particles (Z) according to the invention are known to the person skilled in the art and are described, for example, in chapter 2.2 in "Pulvermetallurgie: Technologien and Werkstoffe [Powder Metallurgy: Technologies and Materials], Schatt, Werner, Wieters, Klaus-Peter, Kieback, Bernd, p. 5-48, ISBN 978-3-540-681112-0, E-Book: https://doi.org/10.1007/978-3-540-68112-0_2".

Preferred processes for producing the silicon particles (Z) according to the invention are inert gas atomization, also called gas atomization, pressurized water atomization, also called liquid atomization or water atomization methods, or melt spinning methods, also called centrifugal atomization or rotary atomization.

The processes described permit the production of metallic silicon particles in a very different particle size range, especially in the average particle size range from a few micrometres to a few millimetres. It is also possible for the metallic silicon particles to be produced in very different grain form, for example "spattered", i.e. very irregularly, ellipsoidally or spherically, and with a very variable range of particle size distribution. Completely surprisingly, it has been found that advantageous properties according to the invention, especially comparatively low combustibility, are exhibited exclusively by those silicon particles that are predominantly rounded and simultaneously fulfil the inventive features a) to d).

The production process for the metallic silicon particles (Z) according to the invention should preferably be executed in such a way that the particles are obtained in their predominantly rounded form according to the invention and hence fulfil features a)-d) and are essentially free of spattered, nodular, angular or sharp particles. The solidified particles may be separated by size in a subsequent process step by standard methods, for example by means of classifying by sieving or by means of sifting. In these methods, it is possible to separate agglomerates and bonded particles, but essentially no particles are destroyed. What is meant by "predominantly rounded" and "essentially free of" is that the presence of such particles is tolerated within the scope of an "impurity" in the particles (Z) according to the invention and does not disrupt their inventive effect.

The crosslinkable silicone composition (Y) according to the invention may, as well as these metallic silicon particles (Z), contain further thermally conductive fillers (Z) having thermal conductivity greater than 5 W/mK. Examples of such further thermally conductive fillers (Z) are magnesium oxide, metallic aluminium powder, metallic silver powder, zinc oxide, boron nitride, silicon carbide, aluminium nitride, aluminium hydroxide, aluminium oxide, graphite, and so forth. Preferred further fillers are aluminium powder, magnesium oxide, aluminium hydroxide, zinc oxide and aluminium oxide. Particularly preferred fillers are aluminium hydroxide and aluminium oxide, with aluminium hydroxide being especially preferred. The shape of the further filler is fundamentally unrestricted. The particles may, for example, be of spherical, ellipsoidal, acicular, tubular, platelet, fibrous or irregular shape. They are preferably of spherical, ellipsoidal or irregular shape. The average diameter of the further thermally conductive fillers (Z) is preferably in the range of 0.01-150 μm, preferably in the range of 0.1-100 μm, more preferably in the range of 0.2-80 μm, especially in the range of 0.4-60 μm.

Fillers having very high density are disadvantageous in use, for example in aircraft and electrical vehicles, since they very significantly increase the weight of the components. The further thermally conductive fillers (Z) preferably have a density of not more than 6.0 $kg/m^3$, preferably not more than 4.5 $kg/m^3$, more preferably not more than 3.0 $kg/m^3$.

In many applications, electrical conductivity of the heat-conducting composition is undesirable since this can lead to short circuits, for example. The composition (Y) according to the invention preferably contains exclusively heat-conducting fillers (Z) having specific resistivity of at least 1 $\Omega \cdot mm^2/m$.

Preferred crosslinkable silicone compositions (Y) according to the invention contain, as thermally conductive filler (Z), the metallic silicon particles according to the invention as the sole thermally conductive filler (Z) or in combination with up to two further thermally conductive fillers (Z). Impurities of up to 5% are not considered here to be a further filler (Z).

If the preferred compositions according to the invention contain the metallic silicon particles (Z) according to the invention as the sole thermally conductive filler (Z) having a thermal conductivity greater than 5 W/mK, preference is given to adding a rheology modifier or thickener that prevents the settling of the filler. Suitable rheology modifiers are known to the person skilled in the art, preference being given to fumed silica, for example component (E).

The total amount of thermally conductive fillers (Z) in the crosslinkable heat-conducting silicone composition (Y) according to the invention is 50-95% by volume, preferably 60-90% by volume, more preferably 65-88% by volume. If the silicone composition (Y) contains smaller amounts of heat-conducting filler (Z), thermal conductivity will be inadequate; if the silicone composition (Y) contains greater amounts of thermally conductive filler (Z), then the composition (Y) will be difficult to process since it will have high viscosity or even be brittle.

The uncrosslinked heat-conducting silicone compositions (Y) according to the invention have a thermal conductivity of at least 0.6 W/mK, preferably at least 0.8 W/mK, more preferably at least 1.2 W/mK, especially at least 1.5 W/mK.

The viscosity of the uncrosslinked thermally conductive silicone compositions (Y) according to the invention may vary within a very wide range and be matched to the requirements of the application. The viscosity of the uncrosslinked thermally conductive silicone compositions (Y) according to the invention is preferably adjusted via the content of thermally conductive filler (Z) and/or the composition of the silicone composition (S), by the standard methods from the prior art. These are known to the person skilled in the art. Preference is given to adjusting the viscosity via the selection and combination of components (A), (B) and (C) and optional addition of a rheology modifier and/or an active filler (E) and/or an alkyltrialkoxysilane (F).

The dynamic viscosity of the uncrosslinked, thermally conductive silicone compositions (Y) according to the invention is preferably in the range of 100-1 000 000 mPa·s, preferably in the range of 1000-750 000 mPa·s, more preferably in the range of 2000-500 000 mPa·s, especially not more than 250 000 mPa·s, in each case at shear rate D=10 s$^{-1}$ and 25° C.

The density of the uncrosslinked silicone compositions (Y) according to the invention is less than 3.5 kg/m$^3$, preferably less than 3.0 kg/m$^3$, more preferably less than 2.5 kg/m$^3$, especially less than 2.3 kg/m$^3$.

The present invention further provides a process for producing the crosslinkable silicone compositions (Y) according to the invention by mixing the individual components.

The components may be mixed by the customary continuous and batchwise prior art methods. Suitable mixing apparatus is any of the known apparatuses. Examples of these are uniaxial or biaxial continuous mixers, twin rollers, Ross mixers, Hobart mixers, dental mixers, planetary mixers, kneaders and Henschel mixers or similar mixers. Preference is given to mixing in a planetary mixer, a kneader or a continuous mixer. The crosslinkable silicone composition (Y) may optionally be heated in the course of mixing, preference being given to mixing within a temperature range of 15-40° C. The procedure for production of the preferred addition-crosslinkable silicone compositions (S) is also known to the person skilled in the art. In principle, the components may be added in any sequence. For example, components e) and optionally g) may be premixed and then mixed with components a) and/or b). It is optionally also possible here to heat the mixture. Preference is given to mixing at least a portion of a) and the alkoxysilane g), then mixing in the heat-conducting filler(s) (Z). The production preferably takes place without active heating.

The crosslinkable silicone composition (Y) according to the invention may be provided as a one-, two- or multicomponent mixture. Examples are two-component heat-curable compositions (Y) or one-component UV-curable compositions (Y). This has likewise long been known to the person skilled in the art.

The crosslinkable silicone composition (Y) according to the invention has very good processing properties with regard to fluidity, gap-filling properties and layer thickness control, and can be applied precisely.

The temperature condition for the curing of the silicone composition (Y) which is preferably curable via hydrosilylation reaction is unlimited and is typically in the range from 20 to 180° C., preferably in the range from 20 to 150° C., preferably in the range from 20 to 80° C.

The present invention further provides the silicone products obtained by dispensing or applying and then crosslinking/curing the crosslinkable silicone composition. The cured silicone products (for example a heat-conducting element) show excellent thermal conductivity and exact layer thicknesses.

The hardness of the crosslinked thermally conductive silicone compositions (Y) according to the invention may vary within a very wide range and be matched to the requirements of the application. For example, for the application as a gap filler, preference is given to using comparatively soft and flexible products, whereas, for example, for the application as a thermally conductive adhesive, preference is given to using comparatively hard and firm products. The hardness of the crosslinked thermally conductive silicone compositions (Y) according to the invention is preferably adjusted via the composition of the silicone composition (S), by the standard methods from the prior art. These are known to the person skilled in the art. Preference is given to adjusting the hardness via the selection and combination of components (A), (B) and (C) and optional addition of a reinforcing filler (E).

The hardness of the cured silicone product is preferably in the range from 2 by the Shore 00 method to 100 by the Shore A method, preferably in the range from 10 by the Shore 00 method to 85 by the Shore A method. For the application as a gap filler, the hardness of the crosslinked thermally conductive silicone compositions according to the invention is especially preferably in the range from 15 by the Shore 00 method to 65 by the Shore A method.

The crosslinked silicone products have a thermal conductivity of at least 0.6 W/mK, preferably at least 0.8 W/mK, more preferably at least 1.2 W/mK, especially at least 1.5 W/mK.

The present invention further provides for the use of the crosslinkable silicone composition as a gap filler (=heat-conducting element), heat-conducting pad, heat-conducting adhesives and encapsulating compounds. They are especially suitable for use as a gap filler for lithium ion batteries of electrical vehicles.

The density of the crosslinked silicone products according to the invention is less than 3.5 kg/m$^3$, preferably less than 3.0 kg/m$^3$, more preferably less than 2.5 kg/m$^3$, especially less than 2.3 kg/m$^3$.

The crosslinked silicone products according to the invention preferably conform to the UL94 V-0 combustibility class.

In a preferred embodiment, the density of the crosslinked silicone products according to the invention is less than 2.5 kg/m³, and the thermal conductivity greater than 1.8 W/mK, and the combustibility satisfies UL94 V-0, with the proviso that the dynamic viscosity of the uncrosslinked silicone compositions according to the invention is less than 500 000 mPa·s, especially less than 250 000, in each case at shear rate D=10 s⁻¹ and 25° C.

In a particularly preferred embodiment, the density of the silicone products according to the invention is less than 2.3 kg/m³, and the thermal conductivity greater than 1.8 W/mK, preferably greater than 3.0 W/mK, and the combustibility satisfies UL94 V-0, with the proviso that the dynamic viscosity of the uncrosslinked silicone compositions according to the invention is less than 500 000 mPa·s, especially less than 250 000, in each case at shear rate D=10 s⁻¹ and 25° C.

Test Methods

Measurement of Thermal Conductivity Lambda

Thermal conductivity is determined to ASTM D5470-12 using a TIM Tester (Steinbeis Transferzentrum Warmemanagement in der Elektronik, Lindenstr. 13/1, 72141 Waldorfhsslach, Germany). This determines the thermal resistance of the sample between 2 test cylinders by means of a constant heat flow. The layer thickness of the sample is used to calculate the effective thermal conductivity.

For the measurement, the sample is applied with the aid of a stencil and the measuring cylinder is narrowed manually to a thickness of 1.9-2.0 mm, then excess material is removed. Thermal conductivity is measured at a constant gap of 1.8-1.6-1.4-1.2-1.0 mm. Evaluation is effected by means of an integrated reporter position. After a plausibility test (straight-line coefficient of determination >0.998), the thermal conductivity lambda is reported as the effective thermal conductivity in W/(m*K).

Measurement of Dynamic Viscosity

Dynamic viscosity was measured using an Anton Paar MCR 302 rheometer according to DIN EN ISO 3219: 1994 and DIN 53019 by means of a flow curve with the following parameters: measurement type: T/D; temperature: 25.0° C.; measuring element: PP25; measurement gap: 0.50 mm; shear rate: 0.1-10 s⁻¹; time: 120 see; measurements: 30. The viscosity reported in Pa·s is an interpolated value at a shear rate of D=10 s⁻¹.

Measurement of Density

The density of the uncrosslinked, thermally conductive silicone compositions was ascertained according to ISO 1183, and the density of the crosslinked, thermally conductive silicone compositions according to ISO 1184.

Particle Size and Particle Shape Analysis

Particle size (median diameter x50), particle size distribution (parameters: standard deviation sigma and distribution range SPAN) and particle shape (parameters: aspect ratio w/l and sphericity SPHT) were analysed with a Camsizer X2 from Retsch Technology (measurement principle: dynamic image analysis) according to ISO 13322-2 and ISO 9276-6 (method of analysis: dry measurement of powders and granules; measurement range: 0.8 μm-30 mm; compressed air dispersion with "X-Jet"; dispersion pressure=0.3 bar). Evaluations were volume-based and by the $x_{c\ min}$ model.

The examples which follow describe the basic implementability of the present invention, but without limiting it to the contents disclosed therein.

In the examples which follow, all figures for parts and percentages, unless stated otherwise, are based on weight. Unless stated otherwise, the examples which follow are conducted at a pressure of the surrounding atmosphere, i.e. at about 1000 hPa, and at room temperature, i.e. about 20° C. or a temperature which is established on combination of the reactants at room temperature without additional heating or cooling.

EXAMPLES

Overview of the Inventive and Noninventive Silicon Powders and Silicon Powder Mixtures Used Table 1 summarizes the properties of the inventive and noninventive silicon powders used in the examples.

Inventive examples 1-6 using inventive silicon powders that have been obtained by means of inert gas atomization, and hence are predominantly rounded, and additionally have a comparatively broad particle size distribution according to the invention.

Noninventive comparative examples V1-V4 use noninventive silicon powders that have been obtained by means of inert gas atomization, and hence are predominantly rounded, but have a comparatively narrow, noninventive particle size distribution and do not fulfil inventive feature c).

Noninventive comparative example V8 uses a noninventive silicon powder that has been obtained by means of inert gas atomization, but has a very irregular, nodular form, and does not fulfil inventive feature b).

Noninventive comparative examples V5-V7 use noninventive silicon powders having a comparatively broad particle size distribution, but have been obtained by means of grinding methods, and hence are essentially angular with sharp edges and do not fulfil inventive feature b). Comparative example V7 has a content of silicon particles smaller than 2 μm of 3.8% by weight and thus additionally does not fulfil feature d).

Example 7: Production of Silicon Powder Mixture 7 (Inventive)

100 g of the noninventive silicon powder from comparative example V2, 200 g of the noninventive silicon powder from comparative example V3, 400 g of a noninventive silicon powder having an x50 of 105.4 mm, a SPAN of 0.35, a w/l of 0.83 and SPHT of 0.92, 200 g of a noninventive silicon powder having an x50 of 133.8 mm, a SPAN of 0.25, a w/l of 0.82 and SPHT of 0.94, and 100 g of the noninventive silicon powder from comparative example V4 are mixed homogeneously with a commercial RW 28 laboratory stirrer system (IKA®-Werke GmbH & CO. KG, 79219 Staufen, Germany).

What is obtained is an inventive silicon powder mixture having an x50 of 107.8 mm, a SPAN of 0.75, a w/l of 0.83 and SPHT of 0.91, and fulfilling inventive features a)-d).

Comparative Example V9: Production of Silicon Powder Mixture V9 (Noninventive)

300 g of a noninventive silicon powder having an x50 of 133.8 mm, a SPAN of 0.25, a w/l of 0.82 and SPHT of 0.94, and 600 g of the noninventive silicon powder from comparative example V4 are mixed homogeneously with a commercial RW 28 laboratory stirrer system (IKA®-Werke GmbH & CO. KG, 79219 Staufen, Germany). What is obtained is a noninventive silicon powder mixture having an x50 of 155.1 mm, a SPAN of 0.41, a w/l of 0.82 and SPHT of 0.94, and not fulfilling inventive feature a).

Abbreviations

Ex. example
V comparative example
PS particle shape
r predominantly rounded
e angular
n nodular
I inventive
NI noninventive
n.d. not determined mixing ratio of 1 part catalyst solution to 10 parts silicone composition, not counting the proportion of thermally conductive filler (Z). The mixture was mixed three times at 2350 rpm by SpeedMixer for 10 seconds, stirring the sample each time by spatula between the mixing operations. What is obtained is a reactive, pasty mass which is storable for only a few hours and was processed further directly.

Step 2: Production of a Crosslinked, Thermally Conductive, Silicon Powder-Containing Shaped Silicone Body A shaped body having dimensions of 207 mm×207 mm×2 mm was produced by means of compression vulcanization in a stainless steel mould at 165° C. and 380 N/cm² for 5 minutes by the standard prior art methods. The vulcanizate

TABLE 1

| | | x50 | | | | | | | |
|---|---|---|---|---|---|---|---|---|---|
| Ex. | x10 (mm) | (mm) Feature a) | x90 (mm) | SPAN Feature c) | Sigma (mm) | SPHT | PS Feature b) | w/l | Comment |
| 1* | 17.2 | 31.5 | 43.5 | 0.83 | 10 | 0.83 | r | 0.83 | I |
| 2* | 18.3 | 36.1 | 55.5 | 1.03 | 14 | 0.79 | r | 0.86 | I |
| 3* | 21.8 | 49.1 | 69 | 0.96 | 38 | 0.79 | r | 0.86 | I |
| 4* | 29.2 | 66.2 | 95.3 | 1.00 | 25 | 0.82 | r | 0.85 | I |
| 5* | 55.7 | 82.9 | 125.8 | 0.85 | 53 | 0.86 | r | 0.83 | I |
| 6* | 100.6 | 136.8 | 169.2 | 0.50 | 55 | 0.94 | r | 0.82 | I |
| 7* | 72.5 | 107.8 | 152.9 | 0.75 | 32 | 0.91 | r | 0.83 | I |
| V1 | 42.9 | 52.1 | 62.5 | 0.38 | 13 | 0.82 | r | 0.85 | NI |
| V2 | 61.1 | 68.6 | 74.7 | 0.20 | 13 | 0.84 | r | 0.85 | NI |
| V3 | 72.6 | 82.1 | 92.2 | 0.24 | 12 | 0.89 | r | 0.83 | NI |
| V4 | 145 | 162.1 | 181.4 | 0.22 | 16 | 0.94 | r | 0.82 | NI |
| V5 | 10.8 | 36.9 | 84.9 | 2.01 | 29 | 0.76 | e | 0.67 | NI |
| V6 | 20.1 | 95.3 | 187.5 | 1.76 | 65 | 0.78 | e | 0.63 | NI |
| V7** | 3.1 | 5.9 | 8.8 | 0.97 | 2 | 0.86 | e | 0.75 | NI |
| V8 | 47.0 | 72.6 | 116.1 | 0.95 | 35 | 0.72 | n | 0.67 | NI |
| V9 | 126.3 | 155.1 | 180.1 | 0.41 | 21 | 0.94 | r | 0.82 | NI |

*The content of silicon particles <2 mm was 0.0% by weight within the measurement accuracy.
**The content of silicon particles <2 mm was 3.8% by weight.

General Method 1 (GM1) for Production of the Crosslinked, Thermally Conductive, Silicon Powder-Containing Shaped Silicone Bodies (Inventive Examples 8 to 14 and Noninventive Examples V10 to V22)

Step 1: Preparation of an Addition-Crosslinkable, Thermally Conductive, Silicon Powder-Containing Silicone Composition 24.5 g of a vinyldimethylsiloxy-terminated polydimethylsiloxane having a viscosity of 1000 mPa·s, 16.3 g of a hydrodimethylsiloxy-terminated polydimethylsiloxane having a viscosity of 1000 mPa·s, 1.0 g of a copolymer composed of dimethylsiloxy and methylhydrosiloxy and trimethylsiloxy units and having a viscosity of 200 mPa·s and a content of Si-bonded hydrogen of 0.18% by weight, were homogenized by means of a SpeedMixer DAC 400 FVZ (Hauschild & Co KG, Waterkamp 1, 59075 Hamm, Germany) at a speed of 2350 rpm for 25 seconds. Thereafter, a silicon powder was added in each case in the ratio according to table 2 and mixed by means of a SpeedMixer at 2350 rpm for 25 seconds. The silicon particle-containing silicone composition was stirred with a spatula to mix in silicon powder residues from the edge of the vessel. This was followed by homogenization at 2350 rpm by Speed-Mixer for a further 25 seconds and cooling to room temperature.

For the crosslinking, 4.18 g of ELASTOSIL® CAT PT (purchasable from Wacker Chemie AG, Hanns-Seidel-Platz 4, 81737 Munich, Germany) was added, corresponding to a was then subjected to heat treatment at 200° C. for 4 hours. What is obtained is a homogeneous and elastic shaped body.

Example 15 Combustibility Testing

Combustibility is tested in a simplified test based on UL 94 V, a standard from Underwriters Laboratories for testing of vertical burning that enables the classification of plastics by their flame retardancy. This method is the most common test for classification of flame-retardant plastics.

Test pieces each of length 5" (127 mm) and width 0.5" (12.7 mm) were punched out of the inventive shaped silicone bodies according to examples 8 to 14 and the noninventive shaped silicone bodies according to comparative examples V10 to V14 and V19 to V22. The plaque is secured in a vertical position at its upper end over a length of ¼". 12" (305 mm) beneath the test plaque is positioned a piece of cotton wool. The burner is adjusted such that a blue flame of length ¾" is formed. The flame is directed from a distance of ⅜" (9.5 mm) onto the lower edge of the plastic plaque. After contact for 10 seconds, the flame is removed. The afterflame time (total afterflame and afterglow time) for the test piece is noted. The sample should be extinguished immediately after the removal of the flame and burn for no more than a further 4 seconds. The test is conducted on 5 different test pieces, and the average value of the afterflame time is ascertained. The results can be found in table 2.

In noninventive comparative experiments V15 to V18, respectively containing 62.5% by volume of the noninventive silicon particles according to comparative examples V5 to V8, which more particularly do not fulfil feature b), a silicone composition of very high viscosity was formed, which could not be pressed to give a suitable shaped silicone body.

and V20 were subjected to the full combustibility test according to UL 94 V and classified as V-0, V-1 or V-2. For many industrial applications, especially for use as a gap filler in electrical vehicles, a V-0 classification is required. The results can be found in table 3.

TABLE 2

Composition and combustibility of silicon powder-containing silicone compositions

| | | Silicon powder according to table 1 | | Crosslinkable silicone composition | | Shaped silicone body | | |
|---|---|---|---|---|---|---|---|---|
| Ex. | Ex. | Amount (g) | Content (% by vol.) | Viscosity (Pa · s) | Density (kg/m$^3$) | Hardness | Thermal conductivity | After-flame time(s) |
| 8 | 1 | 184.0 | 62.5 | 6.1 | 1.82 | 74 | 1.7 | 3 |
| 9 | 2 | 184.0 | 62.5 | 6.3 | 1.82 | 72 | 2.0 | 1 |
| 10 | 3 | 184.0 | 62.5 | 5.9 | 1.82 | 71 | 1.9 | 0 |
| 11 | 4 | 184.0 | 62.5 | 5.0 | 1.82 | 70 | 2.0 | 2 |
| 12 | 5 | 184.0 | 62.5 | 4.8 | 1.82 | 74 | 1.8 | 0 |
| 13 | 6 | 184.0 | 62.5 | 3.8 | 1.82 | 83 | 1.8 | 2 |
| 14 | 7 | 184.0 | 62.5 | 4.1 | 1.82 | 74 | 1.9 | 2 |
| V10 | V1 | 184.0 | 62.5 | 10.1 | 1.82 | 75 | 1.9 | 6 |
| V11 | V2 | 184.0 | 62.5 | 12.5 | 1.82 | 72 | 1.9 | 15 |
| V12 | V3 | 184.0 | 62.5 | 15.3 | 1.82 | 81 | 1.9 | 5 |
| V13 | V4 | 184.0 | 62.5 | 13.2 | 1.82 | 83 | 2.0 | 9 |
| V14 | V9 | 184.0 | 62.5 | 5.2 | 1.82 | 78 | 1.9 | 20 |
| V15 | V5 | 184.0 | 62.5 | n.d. | n.d. | n.d. | n.d. | n.d. |
| V16 | V6 | 184.0 | 62.5 | n.d. | n.d. | n.d. | n.d. | n.d. |
| V17 | V7 | 184.0 | 62.5 | n.d. | n.d. | n.d. | n.d. | n.d. |
| V18 | V8 | 184.0 | 62.5 | n.d. | n.d. | n.d. | n.d. | n.d. |
| V19 | V5 | 107.3 | 49.2 | 12.7 | 1.64 | 4 | 1.1 | 21 |
| V20 | V6 | 107.3 | 49.2 | n.d. | 1.64 | 12 | 1.2 | 23 |
| V21 | V7 | 107.3 | 49.2 | n.d. | 1.64 | 31 | 1.1 | 70 |
| V22 | V8 | 107.3 | 49.2 | n.d. | 1.64 | n.d. | n.d. | 121 |

In the testing of combustibility, it was found that comparative examples V10 to V14 and V19 to V22, containing a noninventive silicon powder or a noninventive silicon powder mixture according to comparative examples V1-V9 which does not fulfil one or more of features a) to d), show comparatively high combustibility. Especially noticeable was the combustibility of noninventive comparative sample V21, containing a silicon powder having an average particle size of less than 20 μm, and the combustibility of noninventive comparative sample V22, containing a silicon powder having a very irregular, nodular particle shape. Both samples continued to burn after the flame had been removed until the shaped body was completely burnt.

Entirely unexpectedly, it was found that silicon powders that simultaneously fulfil features a)-d) show the inventive advantage of reduced combustibility. In inventive example 14, moreover, it was found, completely surprisingly, that mixing of multiple noninventive silicon powders can produce an inventive silicon powder mixture having the advantageous property according to the invention of low combustibility, provided that the resultant mixture fulfils features a) to d). By contrast, the noninventive silicon powder mixture from comparative example V8 does not fulfil features a) to d) and also does not show the advantages according to the invention.

Example 16 Full Combustibility Test According to UL 94 V

The inventive shaped silicone bodies from inventive examples 11 and 12 and the noninventive shaped silicone bodies from noninventive comparative examples V11, V12

TABLE 3

Combustibility test according to UL 94 V

| Ex. | UL 94 V classification | Comment |
|---|---|---|
| 11 | V-0 | I |
| 12 | V-0 | I |
| V11 | V-1 | NI |
| V12 | V-1 | NI |
| V20 | V-2 | NI |

Example 17 Production of a Crosslinked, Thermally Conductive Shaped Silicone Body Containing an In Situ Mixture of Two Silicon Powders (Inventive)

According to general method GM1, an inventive crosslinkable thermally conductive silicone composition was produced by separately having, as silicon powder, 164.90 g of the inventive silicon powder from example 1 (37.6% by volume based on the total amount of the thermally conductive silicone composition) and 161.74 g of a noninventive silicon powder having an x50 of 105.4 mm, a SPAN of 0.35, a w/l of 0.83 and SPHT of 0.92 (36.8% by volume based on the total amount of the thermally conductive silicone composition) and mixing them in situ to form an inventive silicon powder mixture.

What was obtained was an inventive reactive silicone composition having a content of inventive silicon particles of 74.4% by volume and a dynamic viscosity of 64 800 mPa·s at shear rate D=10 s$^{-1}$ and 25° C. The thermal conductivity was 4.98 W/mK and the density 1.97 kg/m$^3$.

The mass according to the invention has good processibility, high thermal conductivity and low density, and is of very good suitability for use as a gap filler. General method GM1 was used to produce an inventive, crosslinked shaped silicone body. The afterflame time according to example 15 was 1.3 seconds. Example 16 resulted in a UL94 V-0 classification.

Comparative Example V23 Production of a
Crosslinked Shaped Silicone Body Containing an
In Situ Mixture of Two Silicon Powders
(Noninventive)

A crosslinked shaped silicone body was produced according to inventive example 17, except using 19.0% by volume of the silicon powder from example 1 and 18.6% by volume of the silicon powder having an x50 of 105.4 mm, a SPAN of 0.35, a w/l of 0.83 and SPHT of 0.92.

The noninventive shaped silicone body has a noninventive total content of thermally conductive filler (Z) of 37.6% by volume and has a thermal conductivity of 0.5 W/mK. Example 16 resulted in a UL94 V-1 classification. The composition is unsuitable for use as a gap filler.

Example 18 Two-Component Gap Filler (Inventive)

Production of the A Component

In a commercial Labotop planetary mixer (PC Laborsystem GmbH, Maispracherstrasse 6, 4312 Magden, Switzerland), equipped with two bar stirrers and a stripper, 115.4 g of a vinyldimethylsiloxy-terminated polydimethylsiloxane having a viscosity of 120 mPa·s and 1.1 g of WACKER® CATALYST EP (purchasable from Wacker Chemie AG, Hanns-Seidel-Platz 4, 81737 Munich, Germany) were mixed at room temperature and a stirrer speed of 300 rpm for 5 minutes. 308.5 g of DAW-05 spherical aluminium oxide (purchasable from Denka Company Limited, Nihonbashi Mitsui Tower, 1-1, Nihonbashi-Muromachi 2-chome, Chuo-ku, Tokyo 103-8338, JAPAN) were added and incorporated homogeneously at 300 rpm under slightly reduced pressure (950 mbar) for 10 minutes. Subsequently, a total of 578.8 g of an inventive silicon powder that has an x50 of 78.8 mm, a SPAN of 1.64, a w/l of 0.81 and SPHT of 0.84 was added in two portions (first portion: 385.9 g, second portion: 192.9 g), and each addition was followed by mixing under slightly reduced pressure (950 mbar) at 300 rpm for 10 minutes. The resultant pasty mass was homogenized at 300 rpm under slightly reduced pressure (950 mbar) for a further 10 minutes. An inventive A component having a content of inventive silicon particles of 55.5% by volume and a total content of thermally conductive filler of 73.1% by volume was obtained. The pasty composition has a density of 2.25 kg/m$^3$, a dynamic viscosity of 59 100 mPa·s at shear rate D=10 s- and 25° C. and a thermal conductivity of 3.3 W/mK and is thus of very good suitability for use as a gap filler.

Production of the B Component

In a commercial Labotop planetary mixer (PC Laborsystem GmbH, Maispracherstrasse 6, 4312 Magden, Switzerland), equipped with two bar stirrers and a stripper, 106.5 g of a vinyldimethylsiloxy-terminated polydimethylsiloxane having a viscosity of 120 mPa·s and 9.0 g of a copolymer composed of dimethylsiloxy and methylhydrosiloxy and trimethylsiloxy units and having a viscosity of 200 mPa·s and a content of Si-bonded hydrogen of 0.18% by weight were mixed at room temperature and a stirrer speed of 300 rpm for 5 minutes. 306.0 g of DAW-05 spherical aluminium oxide (purchasable from Denka Company Limited, Nihonbashi Mitsui Tower, 1-1, Nihonbashi-Muromachi 2-chome, Chuo-ku, Tokyo 103-8338, JAPAN) were added and incorporated homogeneously at 300 rpm under slightly reduced pressure (950 mbar) for 10 minutes. Subsequently, a total of 574.0 g of an inventive silicon powder that has an x50 of 78.8 mm, a SPAN of 1.64, a w/l of 0.81 and SPHT of 0.84 was added in two portions (first portion: 382.7 g, second portion: 191.3 g), and each addition was followed by mixing under slightly reduced pressure (950 mbar) at 300 rpm for 10 minutes. The resultant pasty mass was homogenized at 300 rpm under slightly reduced pressure (950 mbar) for a further 10 minutes. An inventive B component having a content of inventive silicon particles of 55.5% by volume and a total content of thermally conductive filler of 73.1% by volume was obtained. The pasty composition has a density of 2.25 kg/m$^3$, a dynamic viscosity of 37 900 mPa·s at shear rate D=10 s$^{-1}$ and 25° C. and a thermal conductivity of 3.7 W/mK and is thus of very good suitability for use as a gap filler.

Production of a Shaped Body

An inventive crosslinked specimen was produced by homogeneously mixing 1 part by weight of the inventive A component and 1 part by weight of the inventive B component, followed by vulcanization according to general method GM1. The resultant shaped body has a Shore A hardness of 1.4. Example 16 resulted in a UL94 V-0 classification. The composition is of very good suitability for use as a gap filler.

The invention claimed is:

1. A crosslinkable, heat-conducting silicone composition (Y), comprising:
   5-50% by volume of a crosslinkable silicone composition (S);
   50-95% by volume of at least one thermally conductive filler (Z) having a thermal conductivity of at least 5 W/mK;
   wherein the crosslinkable, heat-conducting silicone composition (Y) has a thermal conductivity of at least 0.6 W/mK;
   wherein at least 20% by volume of metallic silicon particles present as thermally conductive fillers (Z) fulfil the following features:
      a) wherein the thermally conductive fillers (Z) have a median diameter x50 that is in the range of 30-150 µm;
      b) wherein the thermally conductive fillers (Z) are predominately rounded, and have a width/length ratio (aspect ratio w/l) that is at least 0.76;
      c) wherein the thermally conductive fillers (Z) have a distribution range SPAN ((x90−x10)/x50) that is at least 0.40; and
      d) wherein the thermally conductive fillers (Z) contain at most 1.5% by weight of silicon particles that are smaller than 2 µm.

2. The crosslinkable silicone composition (Y) of claim 1, wherein the crosslinkable silicone composition (Y) is an addition-crosslinking silicone composition.

3. The crosslinkable silicone composition (Y) of claim 1, wherein the crosslinkable silicone composition (Y) contains at least 25% by volume of metallic silicon particles present as thermally conductive fillers (Z).

4. The crosslinkable silicone composition (Y) of claim 1, wherein the crosslinkable silicone composition (Y) contains only one or two further thermally conductive fillers (Z) aside from the metallic silicon particles.

5. The crosslinkable silicone composition (Y) of claim 1, wherein the metallic silicon particles present as thermally conductive fillers (Z) have a sphericity value SPHT of at least 0.75.

6. The crosslinkable silicone composition (Y) of claim 1, wherein the median diameter x50 of the metallic silicon particles present as thermally conductive fillers (Z) is in the range of 40-130 μm.

7. The crosslinkable silicone composition (Y) of claim 1, wherein the crosslinkable silicone composition (Y) has a thermal conductivity of at least 0.8 W/mK.

8. The crosslinkable silicone composition (Y) of claim 1, wherein the crosslinkable silicone composition (Y) has a dynamic viscosity of 1000-750 000 mPa·s, in each case at shear rate D=10 $s^{-1}$ and 25° C.

9. The crosslinkable silicone composition (Y) of claim 1, wherein the crosslinkable silicone composition (Y) is used as a gap filler (heat-conducting element), heat-conducting pad, heat-conducting adhesives and encapsulating compounds.

10. The crosslinkable silicone composition (Y) of claim 1, wherein the crosslinkable silicone composition (Y) are is used as a gap filler for lithium-ion batteries of electrical vehicles.

11. Process for producing crosslinkable silicone compositions, comprising:

providing crosslinkable silicone composition (Y), wherein the crosslinkable silicone composition (Y) comprises 5-50% by volume of a crosslinkable silicone composition(S), 50-95% by volume of at least one thermally conductive filler (Z) having a thermal conductivity of at least 5 W/mK, wherein the crosslinkable heat-conducting silicone composition (Y) has a thermal conductivity of at least 0.6 W/mK, and wherein at least 20% by volume of metallic silicon particles present as thermally conductive fillers (Z) fulfil the following features:

a) wherein the thermally conductive fillers (Z) have a median diameter x50 that is in the range of 30-150 μm;

b) wherein the thermally conductive fillers (Z) are predominately rounded, and have a width/length ratio (aspect ratio w/l) that is at least 0.76;

c) wherein the thermally conductive fillers (Z) have a distribution range SPAN ((x90−x10)/x50) that is at least 0.40;

d) wherein the thermally conductive fillers (Z) contain at most 1.5% by weight of silicon particles that are smaller than 2 μm; and mixing the individual components.

12. The process of claim 11, wherein the crosslinkable silicone compositions obtained are obtainable by dispensing or applying and then curing the inventive crosslinkable silicone compositions.

13. The process of claim 11, wherein the crosslinkable silicone compositions are used as a gap filler (heat-conducting element), heat-conducting pad, heat-conducting adhesives and encapsulating compounds.

14. The process of claim 11, wherein the crosslinkable silicone compositions are used as a gap filler for lithium-ion batteries of electrical vehicles.

* * * * *